United States Patent [19]

Schmidt et al.

[11] 4,029,455
[45] June 14, 1977

[54] APPARATUS FOR INTRODUCING STARTING MATERIALS INTO A SHEARING GAP OF A MACHINE FOR PRODUCTION OF FLAT STRUCTURES

[75] Inventors: Herbert Schmidt, Offenback (Main); Joachim Herzel, Frankfurt am Main; Dietrich Zickler, Muhlheim (Main), all of Germany

[73] Assignee: Zimmer Plastic GmbH, Frankfurt, Germany

[22] Filed: Feb. 26, 1975

[21] Appl. No.: 553,178

Related U.S. Application Data

[62] Division of Ser. No. 264,398, June 15, 1972, abandoned.

[30] Foreign Application Priority Data

Dec. 15, 1971 Germany .......................... 2162229

[52] U.S. Cl. .............................. 425/142; 425/145; 425/297; 425/324 R; 425/363; 264/76; 264/175
[51] Int. Cl.² ........................................ B29C 15/00
[58] Field of Search ................ 264/76, 152, 175; 425/142, 297, 324 R, 363, 145

[56] References Cited

UNITED STATES PATENTS

| | | | |
|---|---|---|---|
| 1,834,573 | 12/1931 | Cadden | 264/175 |
| 2,625,712 | 1/1953 | Eaby | 264/76 |
| 2,885,727 | 5/1959 | Wright | 425/297 |
| 2,914,807 | 12/1959 | Robbins | 264/76 |
| 3,128,500 | 4/1964 | Cunningham | 425/142 |

Primary Examiner—Robert L. Spicer, Jr.
Attorney, Agent, or Firm—Allegretti, Newitt, Witcoff & McAndrews

[57] ABSTRACT

Apparatus for introducing starting materials into the shearing gap of a machine for producing plastic films, ribbons, foils or plates. A plasticized plastic starting material is severed into strings having a length substantially equal to the working width of the shearing gap and the resultant strings are introduced into the shearing gap substantially simultaneously over the width of the gap. The apparatus greatly increases the capacity of the machine, the homogeneity of the product over the entire width and the capability of the machine to supply a greater number of starting materials.

6 Claims, 2 Drawing Figures

APPARATUS FOR INTRODUCING STARTING MATERIALS INTO A SHEARING GAP OF A MACHINE FOR PRODUCTION OF FLAT STRUCTURES

This is a division, of application Ser. No. 264,398, filed on June 15, 1972, now abandoned.

BACKGROUND OF THE INVENTION

The invention relates to an apparatus for the feeding of starting materials into the shearing gap of machines for the production of plastic films, ribbon, foils or plates, in which the shearing gap is bounded, on a long side, by a horizontal, heated, turnable roller.

Machines for the production of films, ribbons, foils or plates, of thermoplastic and duroplastic plastic materials, including the elastomer plastics, are adequately well known. As used herein, "duroplastic" refers to a "thermosetting resin." Such machines consist of a roller with a corresponding fixed counterpart or several rollers between which the plasticized plastic are melted, kneaded and homogenized. The end product is generally taken off as an endless foil from the last roller.

There also belong to these machines the so-called coating machines, in which the plastic ribbon is taken from the last roller by means of a carrier ribbon. There the carrier ribbon and plastic foil are inseparably united with one another and form a so-called composite foil.

An essential element of these machines is the portion where the starting materials are fed. In the majority of all the machines, there is used a so-called "shearing gap," the designation of which has come about by the manner in which the parts forming it function. Involved is a wedge-shaped chamber (in the gap) with the narrower section directed downward, whose length corresponds substantially to the width of the ribbon to be generated. One longitudinal wall of the chamber is formed by a turnable heated roller, whose surface moves downward in the zone of the shearing gap and, in the process, carries along a certain amount of molten or softened plastic through the gap opening. The other longitudinal wall can be variously constructed. It is possible, for example, to construct the other wall as a fixed wedge, shoe or also as a bar. As a longitudinal wall, however, there also comes in question a second roller, which turns opposite to the first and with a lower circumferential velocity. Through the differing circumferential velocity between the rollers, there comes about a shearing effect in the plastic composition. The processing in the shearing gap is of determinative importance since it determines the properties of the end product and the economics of the process. The feed-in process for the starting materials is important since the type of feed (in part) influences the processes in the shearing gap.

For some time, the so-called ribbons have had considerable significance. Carrier ribbons which are coated (lined) with plastics yield composite materials which have new and better properties than the two starting materials by themselves. Excellent possibilities of use are yielded in respect to furniture covering materials, curtain materials, protective clothing, decorative materials and wallpapers, patent leather, for example, for seat coverings, tarpaulins and tents, lattice fabrics permeable to light, bags, sealable inlays for material reinforcement, floor coverings, packings, sealable papers, insulating papers for buildings, packings for closures of flanges, book bindings, etc. From this enumeration, it is evident that the process described is utilized for a large number of products which are needed in large quantities. Experience has shown that the demand for the corresponding products has risen recently with more than average sharpness and, in the future, will rise further. It is obvious that with such a demand, improvements in the production process and of the devices required therein will have considerable effect on the pricing, or with a constant price, will permit the production of higher value products. In particular, a production increase in existing installation is an advantage not to be underestimated.

An an apparatus that come under the category described is known; for example, see German Patent No. 1,213,107. Closed fabrics, lattice fabrics, knits, tricot, fleeces, non-woven fabrics of threads or fibers of all kinds, including plastics, papers of every type, windable cardboard, foils of synthetic leather or metal, etc. serve as carrier ribbons. Thermoplastic materials used include hard and soft PVC (polyvinyl chloride), high-pressure and low-pressure polyolefins, polyurethane, polyamides, polystyrene, cellulose acetate, ionomers, acetobutyrate, copolymerizates, foamable polymers and synthetic and natural waxes. Papers and fabrics become, depending on the exact coating material utilized, impermeable to liquids, water vapor, gas, fats and aroma substances. They can be welded or hot-sealed, as desired in packaging technology or in the wrapping (konfektionierung) of textiles. For the packing of foods or pharmaceutical articles, physiologically faultless materials are produced with suitable thermoplasts. Tearing strength or abrasions resistance can be increased. By choice of the plastic color and use of corresponding embossing rollers, there are achieved manifold surface effects. Composite foils combine the advantageous properties of carrier foil and coating materials.

The starting materials are not restricted to thermoplastic materials. Thermosetting resins (duroplasts) can also be used such as, for example, unsaturated polyester resins and elastomers, and synthetic and natural types of rubber such as neoprenes, butadienes, acrylonitriles and natural rubber. In the case of composite materials, there are used in addition to elastic carrier webs, rigid carriers, such as plates or plaques.

There exists a substantial problem in the known apparatus in respect to the charging of the apparatus with plastics. It is a known practice to carry out the charging by feeding in nonplastic materials, such as granulate, powder, dry blend, blocks and pastes. This type of feed is used mainly in the so-called melt roll process wherein the plastic is supplied from a supply container over a controllable dosage device to the roller gap. The scope of use, however, is limited by a restricted output capacity and the second hot process required for the production of the granulate.

There has also been used a hot-feed of the thermoplastic materials over the so-called Banbury-mill route. Here, there is used a type of preplastification, which is used mainly in calendering machines. The thermoplastic material is worked up in a stamp kneader and plasticized and thereupon supplied discontinuously over a conveyor belt to the milling machine. The plasticized material is then cut and rolled on the milling machine and supplied to the first roller mouth. With this method there are associated therewith the disadvantages of a discontinuous process with irregular feed and poor feed form (packages). Due to the latter, there occur different viscosities of the plastic in the roller gap, so that the production of uniform, good end products is rendered difficult if not even prevented.

There also exists an extruder feed carried out by means of a swinging arm. Here, the premixed material is supplied to an extruder and plasticized into a continuously emerging plastic string. This string is supplied over a swinging arm in pendulation to the roller mouth. It is regarded as disadvantageous that the swinging movement of the plastic string causes an uneven charging in width. The charging in width varies, moreover, with the feed velocity. A further restriction on the possibilities of using this method is that only thermoplastic materials in a certain melt viscosity range can be used. There occur, therefore, viscosity fluctuations in the plastic in the roller gap and the fed-in plastic, as well as unacceptably high temperature variations between the melt in the roller gap and the fed-in plastic. This has a negative effect on the quality of the finished product. Especially disadvantageous is this type of charging in the case of two-and three-roller calenders. Finally, it has been proved that in the above-mentioned charging process, there arise considerable difficulties in the starting of such an apparatus.

It is a further known practice to have an extruder before a calendering or a melt roll machine from which an oscillating conveyor belt leads to the roller mouth. The extruded string is subdivided into small sections, which are conveyed over an oscillating conveyor belt into the roller mouth. There arise similar disadvantages as in the extruder feed system with a swinging arm as described earlier.

Furthermore, it is known to carry out the charging of calendering machines by means of a flat sheet die. The material plasticized by the extruder is drawn off as a film from the flat sheet die and supplied to the roller gap. It is to be regarded as a disadvantage on such a measure that both the thickness, width and throughput of such a charging method are narrowly limited.

A further limit exists in regard to the selection of the usable plastics in which, additionally, the formula is to be maintained very accurately. In the unavoidable color changes there arise complicated cleaning operations. Undesirable also, are the long adjusting times of the apparatus, whereby there results a high loss in material. Further, it was ascertained that in this type of charging, there is an increased tendency for the thermoplastic material to decompose, especially in the border zones of the flat sheet dies. Especially striking is this tendency in the case of rigid PVC. Finally, the width of a die is not adjustable, so that for each film width there has to be available a special sheet die. As a result, the investment costs are increased, and the change-over times are unnecessarily lengthened.

Underlying the present invention, therefore, is the task of eliminating the inadequacies related to the charging apparatus hitherto known and to fulfill the following requirements: the charging of the shearing gap should extend over its entire length, i.e., over the so-called working width. The plastic should have a uniform viscosity in the shearing gap over the entire working width. A constant mean filling height in the shearing gap should be achieved over the entire working width. With increased output capacity, the quality of the finished product should be improved. Further, the charging device should be adaptable in the simplest manner to different working widths. Finally, and this point is of special importance, the number of plastics economically usable for the production of flat plastic structures should be extended.

SUMMARY OF THE INVENTION

The invention solves the problem posed by the apparatus described by insuring that starting materials are preplasticized and supplied in the form of one or more string sections, whose length corresponds substantially to the working width, and fed discontinuously to the shearing gap. The introduction of the string or strings into the shearing gap is brought about essentially simultaneously over the entire width.

With the process of the invention, it is possible to not only remedy the disadvantages affecting the known processes and to fulfill completely the requirements set, but there also occurs the following additional advantages: the operation of a calender or melt roll coater is extremely facilitated, since there occur short adjusting times and the smallest possible losses in material. A change in the plastic to be processed is easly provided. A color change is also perceptibly facilitated and accelerated. Further, the entire arrangement is space- and power-saving. The finished products have, over their entire length and width, excellent homogeneity in respect to all the technical properties, including an optically faultless quality. Any overheating and thermal decomposition in the border zones, caused by different residence times, is definitely avoided. The possibility of readjusting the rolling bank height to a low, constant value assures a constant and short residence of the plastic in the shearing gap. A further consequence is the constant melt viscosity. From these benefits there result a higher output and an improved quality of the finished product. The type of feed used in the invention makes it possible to either save one roller gap on a calender or to increase the output rate considerably.

Also, the separating or bending forces in the shearing gap are kept low by the object of the invention. As a result, the film formation takes place with the greatest possibile uniformity of thickness over the entire working width. The lower separating forces in the shearing gap permit the production of machines with a larger working width and/or smaller constructional expenditure.

In roller mechanisms, it is a well-known fact that there occurs a temperature drop at the border zones which results in a thickness deviation over the profile width of the finished product. Through feeding string sections with a shorter length than the corresponding working width, there sets in a flowing out of the plastic melt into the border zone. The effect of the border zone thickening is diminished through the lower melt viscosity.

Moreover, the remaining constant filling height of the rolling bank, as a result, avoids air inclusions as well as the formation of cold spots above the rolling bank. Since the power input of calenders or melt roll machines which operate according to the roller melt process is, in general, primarily dependent on the forces in the shearing gap, the reduction of the forces accomplished by the invention results in a saving of power.

Preferably, the length of the string section or of the string sections corresponds to the working width. However, both dimensions need not be equal. Slightly deviating lengths of the plastic string lead to fully satisfactory results. The optimal length of the fed-in string sections can be easily ascertained by simple experiments. Also, the requirement that the introduction of the string section on the entire length be brought about substantially simultaneously is not restricted to the point that the string section runs in all phases of movement parallel to the shearing gap and touches the boundary surfaces simultaneously at all points. There is also admissible an introduction of the string in which the axis of the fed-in string section does not run rectilinearly and/or from time to time is under a slight angle to the shearing gap. The string section automatically arranges itself within the shearing gap parallel to its boundary surfaces.

The supplying of the string section takes place, however, in the simplest manner and is extremely reliable in respect to the time spacing in the successive charging of a large number of string sections if the preplasticized string is supplied to the shearing gap running parallel to the string. The string is then cut after reaching a predetermined position and, with the maintenance of the parallelism of the string and the shearing gap, introduced into the gap.

The feeding apparatus according to the invention is suited for all machines which have as first stage a shearing gap. The object of the invention is utilized to special advantage, however, in machines with two adjacently arranged rollers turning oppositely, one of which has a high circumferential velocity and a higher surface temperature than the other. In this system, the plastic is taken off after the shearing gap formed by the rollers, in the form of a film, ribbon, foil or plate, from the faster turning roller.

Also, the apparatus of the invention finds particular application in coating machines of this type, which have a contact pressure roller allocated to the more rapidly turnable roller for the pressing on of a carrier web.

The type of feeding is not restricted to an arrangement wherein only a single plastic string is put into the shearing gap, but it is also possible to feed several strings simultaneously. In this embodiment, a part of the strings can have a different color or consist of another material, in order to bring about color effects in the finished product. A single string can consist of various plastic layers which differ in respect to color and material. Thus, for example, a blue-green combination is contemplated.

Advantageous results are obtained if, in the case of the utilization of rigid PVC as plastic, the preplasticized string is heated to temperatures between 150° and 200° C, preferably between 170° and 180° C. For polyurethane, the strings are heated to a temperature between 120° and 220° C, preferably between 160° and 195° C.

With use of soft PVC as plastic, there is added to the plastic for the purpose of softening between 10 and 50%, preferably between 15 and 35%, of plasticizer.

In regard to the appropriate surface temperature of the rollers, there exist temperature differences that are dependent on the plastic used. With use of plasticized PVC, it is advantageous to heat the counter and film-carrying rollers to surface temperatures between 120° and 220° C, preferably between 160° and 180° C.

The apparatus of the invention is equally suited for all plastics that can be extruded as a string. In contrast to the plastics usable in the processes hitherto known, the palette of the economically workable plastics is extended by the following: rigid PVC, ABS (acrylonitrilebutadiene-styrene resins), polyurethanes, thermoplastic elastomers, thermoplastic polyesters and hot melts, i.e., mixtures of styrenebutadiene, microcrystalline polyethylenes, terpenes, natural rubbers, thermosetting resins, low-molecular resins.

An apparatus to be used in performing the process for the invention, is characterized by a charging device for the production of an endless plastic string, a transport arrangement for the movement of the plastic string parallel to the shearing gap, a cut-off device for making uniform string sections as well as an ejection device for introducing the string sections into the shearing gap. Preferably, the apparatus includes, as a plasticizing device, a melt extruder, because there can be produced efficiently a homogeneous, plasticized melt.

A melt extruder, as is well known, consists of at least one driven extruder screw and a housing with at least one outlet. A particularly simple construction of a charging device and a dependable string guidance result if the axes of the extruder screw and of the string outlets run parallel to the shearing gap. It is not, however, absolutely necessary to allocate the plasticizing arrangement directly to the transport arrangement, for it is also possible to accommodate the plasticizing device in another place for reasons of process control and/or for the sake of better accessibility. In this case, there is provided between the plasticizing device and the transport arrangement, a connecting member as feed arrangement which, like the transport device, is preferably a conveyor belt.

The cut-off device which serves to produce preplasticized string sections of constantly equal length, consists, according to the further invention, of a signal generator actuatable by the plastic string and a cutting device controlled by the generator. The signal generator can be executed, for example, as a microswitch or end switch, but it is also possible to use directly a light barrier, a digital measuring system, or a comparable equivalent arrangement. In the case of a delay-free conversion of the pulse into a cutting operation, the spacing between the signal generator and the cutting device corresponds exactly to the length of the severed string section. To achieve a variation in the length of the string section, it is merely necessary to arrange the signal generator longitudinally slidable parallel to the transport device or to the roller axes or, correspondingly, for example, in the digital measuring system, to prescribe a different signal number.

The ejection device consists, according to a further embodiment, of another signal generator actuatable by the plastic string, or a digital measuring system, a stripper movable transversely to the transport device, controlled by the digital measuring system, and a guide arrangement leading to the shearing gap. The signal generator, which is likewise preferably arranged slidable longitudinally parallel to the shearing gap, is adjusted in such a way that by means of the string section, a control signal is given when the string section occupies precisely such a position with respect to the shearing gap. After triggering of the stripper by means of the guide device and under the action of gravity, the string passes to a predetermined place inside the shearing gap. So that no hampering between the severed string and the following plastic string occurs, during the short interval of time between the cutting off and the stripping or ejecting of the string section, the transport device or the conveyor belt is preferably driven at a speed slightly greater than that of the emerging plastic string. As a result, there is formed after the severing of the string section, between the severed string and the following string, an ever-increasing spacing, which is such that there occurs no hampering of the string ends lying opposite one another. A particularly compact and space-saving construction is obtained when the charging device, inclusive of the plasticizing device, is arranged laterally above the shearing gap and when the guide device is constructed as a steep plane descending to the shearing gap.

Examples of execution of the apparatus of the invention are described in detail below by reference to FIGS. 1 and 2.

DESCRIPTION OF PREFERRED EMBODIMENT

Figure 1:
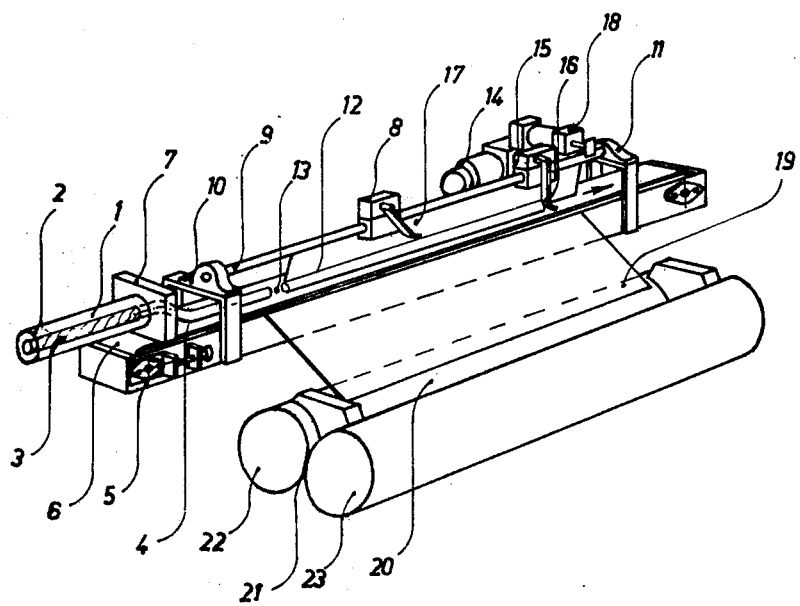
FIG. 1 shows a perspective view of the most essential parts of a coating machine in connection with a charging device to which the plasticizing device is directly allocated and FIG. 2 shows a similar arrangement, but with spatial separation of plasticizing device and transport or ejection device.

In FIG. 1, there is designated a plasticizing apparatus 1, which consists of an extruder 2 with an extruder screw 3. Supply containers, filling apertures and drives of the extruder are omitted in the interest of simplicity. Underneath an emerging plastic string 4, there is arranged a conveyor device 5, which consists of a conveyor belt 6. The axis of the extruder screw and the direction of movement of the conveyor belt 6 run parallel to each other. At the outlet end of the extruder, there is engaged a cutting device 7, which receives its control pulses from a signal generator 8, which is constructed as an end switch. The signal generator 8 is arranged to slide longitudinally on a carrying rail 9, which runs above the conveyor belt 6 and parallel to it. At both ends, the carrying rail is held by portals 10 and 11, respectively. The parts 7 and 8 together form a so-called "cut-off device." The plastic string 4 was already severed once, to produce a string section 12. Since the speed of the conveyor belt 6 is slightly higher than the emergence speed of the plastic string 4 from the extruder 2, there has arisen between the plastic string and the string section 12 and intermediate space 13. For the regulation of the speed of the conveyor belt 6, one of the deflection rollers (not designated in detail) of the conveyor belt is provided with a regulating drive 14.

On the carrying rail 9, there is also another signal generator 15, which is likewise constructed as an end switch and is provided with a sensing lever 16. The sensing lever 16 is situated with its lower end in the path of the string section 12 and moves in the direction designated by the arrow on conveyor belt 6. To the side of and parallel to the string 12, there is arranged a stripper 17 in the form of an elongated sheet metal strip fastened to the carrying rail 9. The carrying rail 9 is turnably borne in the portals 10 and 11, so that the stripper 17 can execute a swinging movement. To bring about this movement, there is present a pneumatic drive 18, which receives its control pulse from the signal generator 15. The control pulse is given at the moment at which the string section 12 touches the sensing lever 16. There is arranged on the side underneath the conveyor belt 6 a guide device 19, onto which the string section 12 passes after operation of the stripper 17. The guide device 19 is constructed as a steep plane whose lower edge ends in a roller mouth 20 or above the shearing gap 21. The shearing gap 21 is formed in this case by two rollers 22 and 23 which are driven at different speeds and heated to different temperatures as described in German Pat. No. 1,213,107, the teachings of which are specifically incorporated by reference herein. It is possible, therefore, to dispense with a thorough description. The parts 15-19 together form an ejection device. It is evident that the direction of movement of the conveyor band as well as the axes of string section 12 and the rollers 22 and 23 run parallel to one another. During the rolling off of the string section 12 on the guide device 19, the parallelism of the string section to the other parts of the apparatus remains substantially unaltered.

Figure 2:
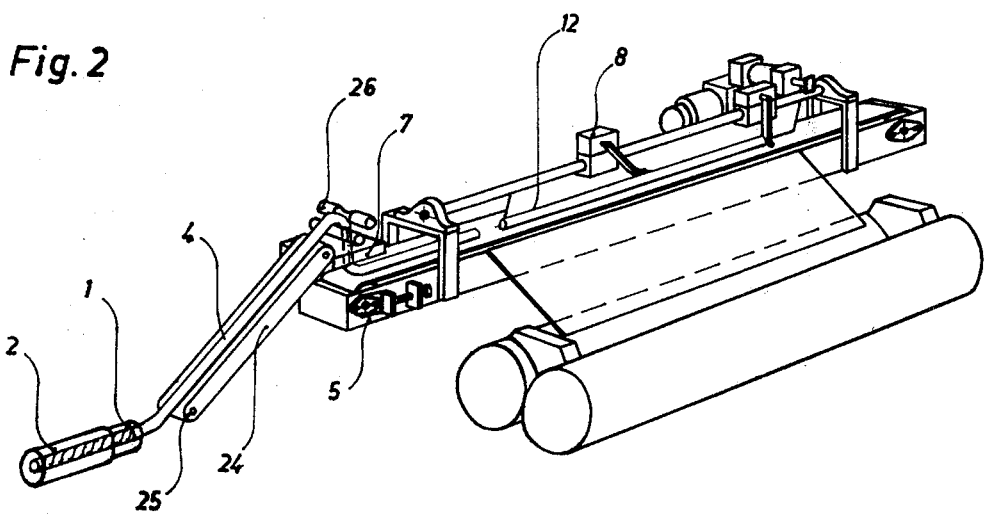

In FIG. 2, the same parts present in FIG. 1 are provided with the same reference numbers insofar as required for understanding. The plasticizing arrangement 1 is spatially separate from the conveyor device 5, in which arrangement a feed device 24 takes over the conveyance of the plastic string 4 from the plasticizing device to the conveyor device 5 proper. The feed device likewise consists of a conveyor belt 25. A stagelessly driven roller pair 26 serves to guide the plastic string 4. At the outlet side of the roller pair 26, there is engaged the cutting device 7 which receives its control pulses in the manner already described through the signal generator 8. The remaining details of the charging apparatus have remained unaltered. The conveyor belt 25 does not have to be absolutely conducted in one plane and it can also be formed by a corresponding system of guide and lead rollers into a bowl or trough.

EXAMPLE 1

An apparatus according to FIG. 1 was equipped with a planetary extruder PWE 150, manufactured by Messrs. Eickhoff, D-463, Bochunn, Germany, with degassing and discharge screw and with a Zimmer Plastic melt coating machine of type KM 1450. In the extruder, there was fed a mixture of a conventional 80% polyvinyl chloride S (Suspension) 60 and ca. 20% of dioctyl phthalate with addition of 2% epoxide. 1.6% Ba/Cd-stabilizers and 0.7% of lubricant as softener aids and extruded in the form of a string, which had an emergence temperature of 170° C. The extruded plastic string had a diameter of 25 mm and emergence speed of 8 m/min. The throughput was around 280 kg/hr. The cutting off of the string took place in lengths of 135 cm. The working width of the melt coating machine amounted to 142 cm. The roller gap was 0.15 mm thick. The rollers themselves had a diameter of 350 mm; one being driven at a rate of 7.2 rpm, and the other at a rate of 9 rpm. The surface temperature of the slow-running roller was 175° C, and that of the more rapidly running roller 177° C. In the case of a cold feed of the same starting material as granulate, the throughput was 120 kg/hr, which is less than half of the hot feed rate. In the process described, it was possible to cut the string exactly to length and, in correspondence to the ejection position, the cut string could be thrown exactly into the roller mouth or shearing gap. The cylindrical form of the plastic string remained preserved up to the entry into the roller mouth. As a result of the uniform apportioning, it was possible to achieve in the roller mouth a filling height that was constant over the entire working width, in which the molten plastic composition was always of constant viscosity. It was possible to draw off the plastic film emerging underneath the roller gap, adhering to the more rapidly running backing roller by means of a carrier ribbon of cotton over a contact pressure roller, free of creases, of entirely uniform thickness and in excellent quality.

EXAMPLE 2

In the apparatus indicated in Example 1, there were processed in an analogous manner 74 kg/hr of polyurethane of the type designation "Estane 58600," manufactured by B. F. Goodrich Chemical Co. The more rapidly running roller had a circumferential speed of 11 m/min. with a surface temperature of 195° C as compared to 180° C on the more slowly turning roller. The foil width was about 1.4 m with a surface weight of 80 g/m$^2$. The foil was entirely homogenous.

EXAMPLE 3

By comparison, the same apparatus was charged with the same starting material as in Example 2, but with the difference that the string feed according to the invention was dispensed with and, instead of this, granulate was fed in a conventional manner. The maximum throughput was around 33.5 kg/hr, and therefore amounted to less than half of the throughput obtained in Example 2.

EXAMPLE 4

The melt coating machine indicated in Example 1 was replaced by a machine of type ZSKM 165 of the same manufacturer, Zimmer Plastic. In an analogous manner, there were worked 67 kg/hr of polyurethane of the type designation "Desmopan 1572," manufactured by Bayer AG, West Germany. The more rapidly running roller had a circumferential speed of 10 m/min. with a surface temperature of 180° C as opposed to 160° C on the more slowly running roller. The foil width was around 1.6 m with a surface weight of 70 gr/m$^2$. The foil was entirely homogenous.

EXAMPLE 5

For comparison, the same apparatus as in Example 4 was charged with the same starting material, with the difference that the string feed according to the invention was dispensed with, and instead, a granulate was fed in a conventional manner. The maximum throughput was around 40 kg/hr, and amounted, therefore, to only a little more than half of the throughput obtained according to Example 4.

We claim as our invention:

1. An apparatus for introducing starting materials into a shearing gap of a machine for producing plastic films, ribbons, foils or plates, said shearing gap being bound on at least one long side by a heated turnable roller having a roller axis, comprising, in combination:
   means for producing at least one endless plasticized string of said starting materials;
   a conveyor belt positioned to withdraw said endless plasticized string from said producing means and to move said endless plasticized string to a predetermined position;
   means for severing said endless plasticized string on said conveyor belt into substantially uniform string sections of a predetermined length, said conveyor belt moving said substantially uniform string sections into said predetermined position wherein said substantially uniform string sections are substantially parallel to said roller axis and above said shearing gap;
   means for injecting said substantially uniform string sections into said shearing gap, said injecting means including a stripper adapted to engagingly remove said substantially uniform string sections from said conveyor belt and means for actuating said stripper in response to said substantially uniform string sections, said substantially uniform string sections being gravity fed into said shearing gap, said stripper being actuated whenever one of said substantially uniform string sections reaches said predetermined position.

2. An apparatus as claimed in claim 1 wherein said injecting means further includes an inclined guide extending downwardly substantially from said conveyor belt to said shearing gap, said stripper removing said substantially uniform string sections from said conveyor belt onto said inclined guide.

3. An apparatus as claimed in claim 1 wherein said producing means is a melt extender.

4. An apparatus as claimed in claim 1 wherein the length of said shearing gap and said predetermined length are substantially equal.

5. An apparatus as claimed in claim 1 wherein said severing means includes a signal generator responsive to movement of said endless plasticized string and a cutting device responsive to said signal generator.

6. An apparatus as claimed in claim 1 wherein said stripper is an elongated member longitudinally extending substantially parallel to said roller axis and being movable substantially traversely thereto.

* * * * *